US011429162B2

(12) United States Patent
Su et al.

(10) Patent No.: US 11,429,162 B2
(45) Date of Patent: Aug. 30, 2022

(54) POWER SUPPLY HOUSING ADAPTED TO REDUNDANT POWER MODULE

(71) Applicant: ZIPPY TECHNOLOGY CORP., New Taipei (TW)

(72) Inventors: Chun-Lung Su, New Taipei (TW); Tzung-Han Lee, New Taipei (TW)

(73) Assignee: ZIPPY TECHNOLOGY CORP., New Taipei (TW)

( * ) Notice: Subject to any disclaimer, the term of this patent is extended or adjusted under 35 U.S.C. 154(b) by 317 days.

(21) Appl. No.: 16/740,725

(22) Filed: Jan. 13, 2020

(65) Prior Publication Data
US 2021/0216115 A1    Jul. 15, 2021

(51) Int. Cl.
*G06F 1/00* (2006.01)
*G06F 1/18* (2006.01)
*G06F 1/26* (2006.01)
*G06F 1/3203* (2019.01)

(52) U.S. Cl.
CPC .............. *G06F 1/188* (2013.01); *G06F 1/263* (2013.01); *G06F 1/3203* (2013.01)

(58) Field of Classification Search
CPC ............. G06F 1/189; G06F 1/188; G06F 1/26
USPC ........................................................ 713/300
See application file for complete search history.

(56) References Cited

U.S. PATENT DOCUMENTS

| 5,865,518 | A  | * | 2/1999  | Jarrett ...................... G06F 1/186 312/223.2 |
| 6,046,912 | A  | * | 4/2000  | Leman ..................... G06F 1/184 361/679.4 |
| 6,315,655 | B1 | * | 11/2001 | McEwan ................. G06F 1/203 361/695 |
| 9,401,627 | B2 |   | 7/2016  | Shih et al. |
| 9,448,605 | B2 |   | 9/2016  | Shih et al. |
| 10,401,923 | B2 |   | 9/2019  | Chuang et al. |
| 10,551,884 | B1 | * | 2/2020  | Chou .................... H05K 7/1432 |
| 2004/0012929 | A1 | * | 1/2004  | Chen ........................ G06F 1/18 361/727 |
| 2004/0233643 | A1 | * | 11/2004 | Bolich ................. H05K 7/1489 361/727 |
| 2006/0209500 | A1 | * | 9/2006  | Park ........................ G06F 1/181 361/679.6 |

(Continued)

FOREIGN PATENT DOCUMENTS

CN    209433362 U    9/2019

*Primary Examiner* — Volvick Derose
(74) *Attorney, Agent, or Firm* — Muncy, Geissler, Olds & Lowe, P.C.

(57) ABSTRACT

A power supply housing adapted to a redundant power module includes a casing, a separation member, two front plates and a back plate. The casing includes four side plates and an installation space defined by the side plates. The separation member divides the installation space into a first sub-space and a second sub-space, and includes two first baffles located in the first sub-space and two second baffles located in the second sub-space. The two first baffles define a first installation region for disposing a redundant power module, and the two second baffles define a second installation region for disposing the redundant power module. The front plates are disposed on one end of the installation space and define a placement opening, serving as an entrance of the first and the second installation region. The back plate is disposed on one end of the installation space not provided with the front plates.

11 Claims, 7 Drawing Sheets

(56) References Cited

U.S. PATENT DOCUMENTS

| | | | |
|---|---|---|---|
| 2006/0285293 A1* | 12/2006 | Toyoda | G06F 1/20 |
| | | | 361/695 |
| 2007/0081308 A1* | 4/2007 | Ishida | H05K 7/1492 |
| | | | 361/724 |
| 2011/0090646 A1* | 4/2011 | Chen | G06F 1/188 |
| | | | 361/679.58 |
| 2012/0270417 A1* | 10/2012 | Lorentzen | G06F 13/4072 |
| | | | 439/55 |
| 2015/0022971 A1* | 1/2015 | Jung | G06F 1/189 |
| | | | 361/679.58 |
| 2016/0205803 A1* | 7/2016 | Zhu | H05K 7/1492 |
| | | | 361/679.02 |
| 2017/0139451 A1* | 5/2017 | Chuang | G06F 1/189 |
| 2018/0232015 A1* | 8/2018 | Chiu | G06F 1/181 |

* cited by examiner

POWER SUPPLY HOUSING ADAPTED TO REDUNDANT POWER MODULE

FIELD OF THE INVENTION

The present invention relates to a power supply housing, and particularly to a power supply housing adapted to a redundant power module.

BACKGROUND OF THE INVENTION

The U.S. Pat. No. 10,401,923 provides a casing. The casing includes a first body, at least one guide plate and a locking plate. The first body has an internal space for accommodating at least two redundant power supplies (equivalent to a redundant power supply module of the present application). The guide plate is disposed on an inner sidewall of the internal space. The locking plate is installed to the first body and extends inward to form a frame, and the locking plate is for locking the casing into a main chassis of a desktop computer.

Further, the China Patent No. 209433362 U provides an ATX specification power supply having redundant power supply. The ATX specification power supply includes a casing, a plurality of power modules (equivalent to the redundant power module of the present application), a power modulation module and a power integration back panel. The casing has an ATX specification housing and a frame provided in the ATX specification housing. The ATX specification housing is hollow and is formed with an installation entrance and at least one opening. The frame includes a frame body enclosing an installation space, a plurality of first separation plates provided at the frame body and located in the installation space, and two second separation plates intervallic located at outside the frame body to define a modulation module installation region. The first separation plates define the installation space into a plurality of power module installation regions. The power modules are respectively disposed in the power module installation regions via the installation entrance, and each of the power modules can separately perform plugging and unplugging with respect to the casing. The power modulation module is disposed in the modulation module installation region via the installation entrance, and can separately perform plugging and unplugging with respect to the casing. The power integration back panel is provided in the ATX specification housing corresponding to the opening. Besides, the power integration back panel also includes a plurality of first connection ports respectively connected to the power modules, a second connection port connected to the power modulation module, and a plurality of power output ports facing the opening.

It could be unambiguously understand from the drawings of the U.S. Pat. No. 10,401,923 that, an internal space for accommodating the at least two redundant power supplies is defined by the multiple guide plates which are labeled as 13 in FIG. 1 and disposed in the first body. Although the implementation mentioned above may seem to be a simple structure, it needs to vastly modify the first body in order to meet requirements. Moreover, the guide plates need to match one another so as to reliably install the redundant power supplies in the guide plates. Further, the implementation mentioned by the U.S. Pat. No. 10,401,923 is difficult to be fine-tuned according to the redundant power supplies in different sizes after the casing is manufactured, so that all of the guide plates should be removed to install another suitable guide plates.

On the other hand, as shown in the China Patent No. 209433362 U, the space for accommodating the power modules is defined by the frame provided in the ATX specification housing. Although the implementation mentioned in the China Patent can reduce the level of modification of the ATX specification housing, development and manufacturing costs are significantly increased since the space is defined by the frame. Besides, the frame fails to be installed individually in the ATX specification housing. In fact, the frame requires to be securely positioned in the ATX specification housing with a bearing seat and positioning structures provided by the frame, resulting in issues of structural complications.

SUMMARY OF THE INVENTION

It is a primary object of the present invention to resolve the issues of structural complications of conventional implementation solutions.

To achieve the above object, the present invention provides a power supply housing adapted to a redundant power module, the housing including a casing, a separation member assembled in the casing, two front plates installed on the casing, and a back plate installed on the casing. The casing includes four side plates and an installation space defined by the four side plates, wherein the four side plates are opposite to each other in pairs. The separation member is connected to two of the four side places opposite to each other, and the separation member divides the installation space into a first sub-space and a second sub-space. The separation member includes two first baffles located in the first sub-space and two second baffles located in the second sub-space. The two first baffles are arranged at an interval, and define a first installation region for accommodating the redundant power module. The two second baffles are arranged at an interval, and define a second installation region for accommodating the redundant power module. The two front plates are disposed at an opening on one end of the installation space, and respectively cover parts of the opening. A part of the opening that is not covered by the two front plates forms a placement opening, which serves as an entrance of the first installation region and the second installation region. The back plate is disposed on one end of the installation space that is not provided with the front plates.

In one embodiment, each of the two front plates integrally formed with one adjacent plate of the side front plates.

In one embodiment, the side plates are divided into two vertical side plates and two horizontal side plates, wherein each of the two vertical side plates integrally formed with one adjacent plate of the two horizontal side plates.

In one embodiment, the two first baffles are formed by two first plate members assembled on the separation member.

In one embodiment, one of the two first plate members includes at least one first positioning hole for disposing a positioning elastic piece of the redundant power supply.

In one embodiment, the separation member includes a connecting plate located in the second sub-space, and the connecting plate is aligned with one of the two second baffles and includes a second positioning hole for disposing the positioning elastic piece.

In one embodiment, the two first baffles and the two second baffles are respectively integrally formed by the separation member.

In one embodiment, the power supply housing includes a connecting piece connected to the separation member and aligned with one of the two first baffles, and the connecting piece includes at least one first through hole for disposing a positioning elastic piece of the redundant power module. The separation member includes a connecting plate located in the second sub-space, and the connecting plate is aligned with one of the two second baffles and includes a second positioning hole for disposing the positioning elastic piece.

In one embodiment, the two first baffle plates integrally formed by the separation member.

In one embodiment, the two second baffles integrally formed by the separation member.

In one embodiment, the two second baffles are formed by two plate members installed on the separation member.

In one embodiment, the width and the height of the casing are in a PS2 specification, and the widths of the first installation region and the second installation region are in a CRPS specification.

The embodiments of the present invention described above provides the following features compared to the prior art. In the present invention, through providing the separation member in the casing, the first installation region and the second installation region for accommodating the redundant power module are defined by the two first baffles and the two second baffles on the separation member, and thus the level of modification of the casing can be reduced. Further, the present invention achieves a function of space division by using a simple structure, thereby resolving the issues of structural complications resulted by a conventional structure.

DETAILED DESCRIPTION OF THE PREFERRED EMBODIMENTS

Terms such as "first" and "second" used in the following description are for distinguishing the same components rather than defining the sequence of the components. On the other hand, directional terms defined in the following description are determined according to the drawings of the description rather than limiting directions of the components of the present application, and a person skilled in the art could unambiguously understand that rotation directions of the drawings of the present application are associated with rotations directions of the related elements. Details and technical content of the present application are given with the accompanying drawings below.

Figure 1:
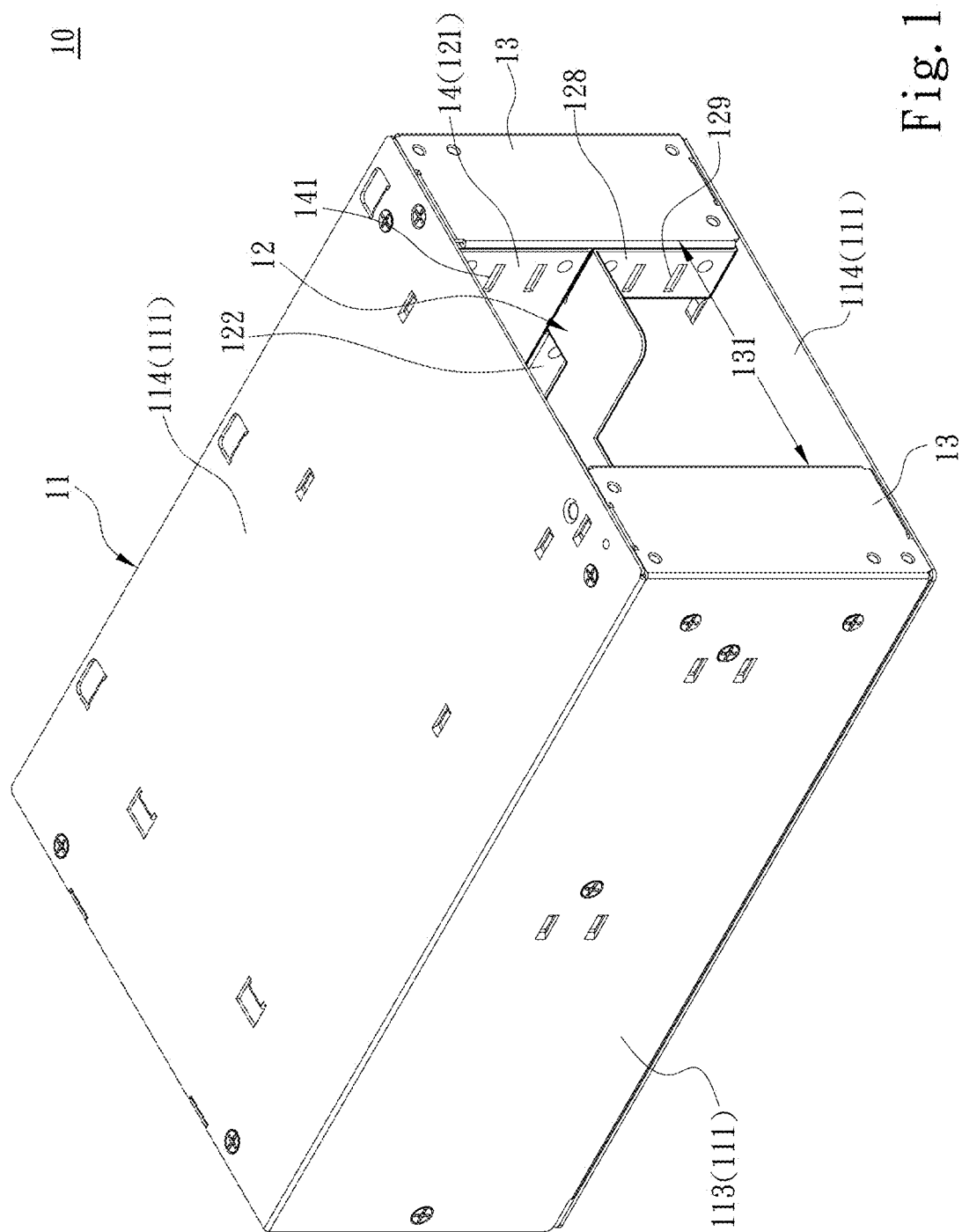
FIG. 1 is a structural schematic diagram of a power supply housing according to an embodiment of the present invention.
Figure 2:
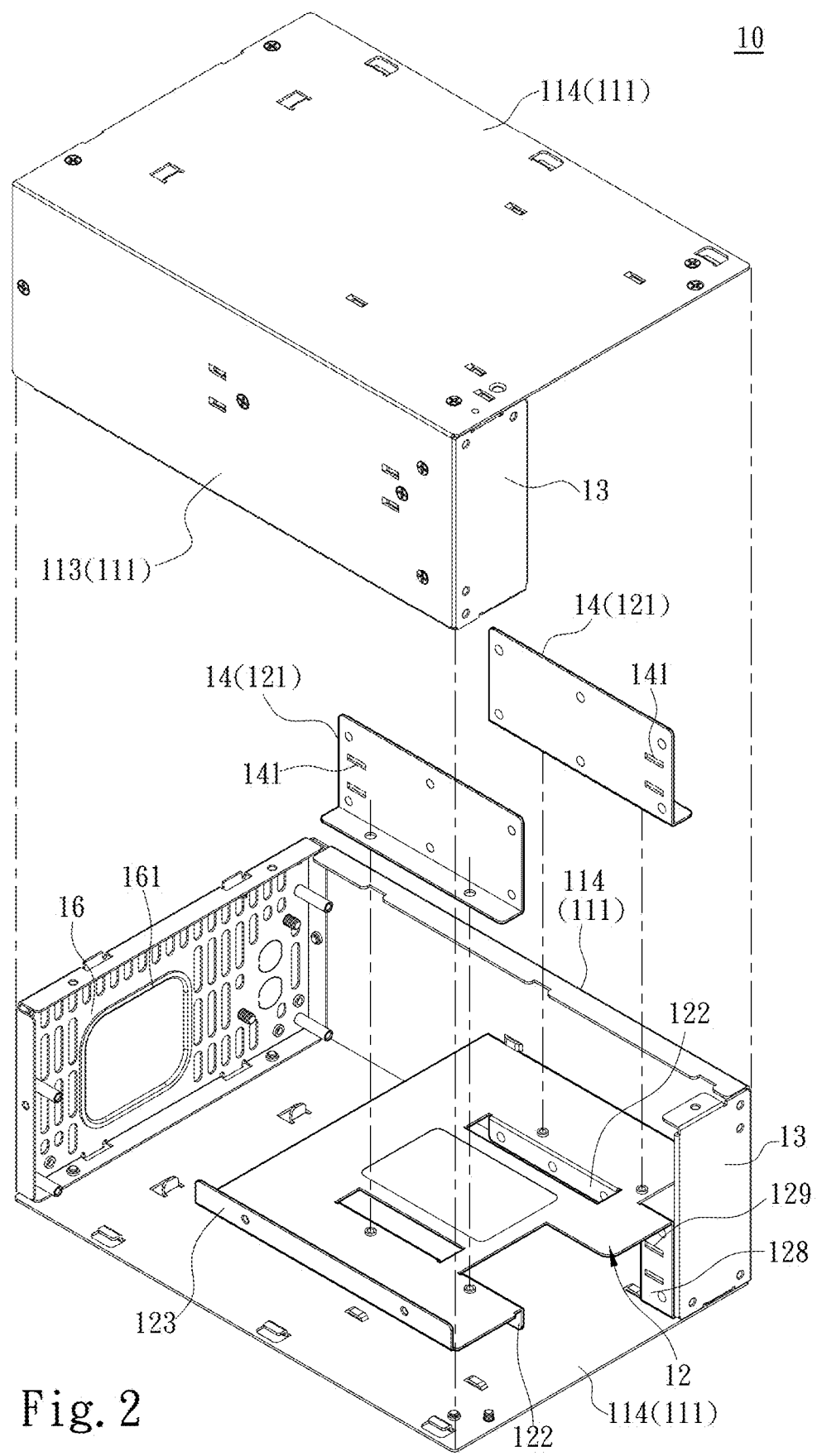
FIG. 2 is a structural exploded diagram of the power supply housing according to an embodiment of the present invention.

Referring to FIG. 1 to FIG. 5, the present invention provides a power supply housing 10, including a casing 11, a separation member 12 disposed in the casing 11, two front plates 13 installed on the casing 11, and a back plate 16 installed on the casing 11. The casing 11 includes four side plates 111 and an installation space 112 defined by the side plates 111. These side plates 111 are opposite to each other in pairs such that the casing 11 is formed as a rectangle. Further, the side plates 111 are divided into two vertical side plates 113 and two horizontal side plates 114. In one embodiment, each of the vertical side plates 113 are integrally formed with one adjacent of the horizontal side plates 114. That is to say, the casing 11 is constructed by two L-shaped casings, as shown in FIG. 2. Further, in one embodiment, the width and the height of the casing 11 are in a PS2 specification; in other words, the casing 11 is in a size of a power supply commonly provided in a computer casing.

Figure 3:
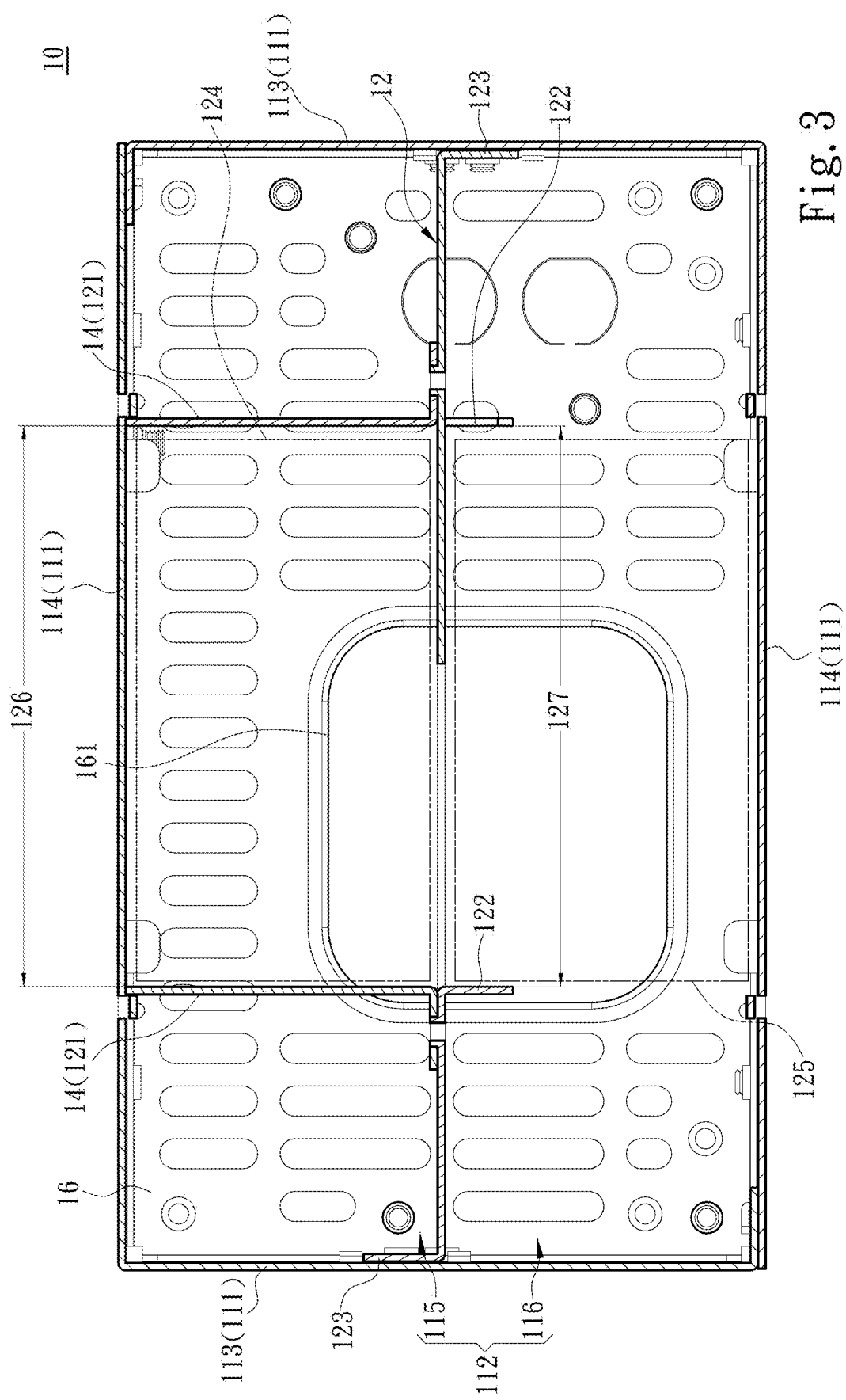
FIG. 3 is a sectional schematic diagram of the power supply housing according to an embodiment of the present invention.

Referring to FIG. 3, the separation member 12 is connected to two of the side plates 111 opposite to each other. In the embodiments shown in the drawings of the present application, the separation member 12 is connected to the two vertical side plates 113. Further, the separation member 12 divides the installation space 112 into a first sub-space 115 and a second sub-space 116, and includes two first baffles 121 located in the first sub-space 115 and two second baffles 122 located in the second sub-space 116. As shown in FIG. 3, each of two opposite edges of the separation member 12 is formed with a connecting wall 123 connected to one of the side plates 111, and the two connecting walls 123 respectively protrude toward the first sub-space 115 and the second sub-space 116. Further, the two first baffles 121 are arranged at an interval to define a first installation region 124, and the two second baffles 122 are arranged at an interval to define a second installation region 125. In one embodiment, the widths 126, 127 of the first installation region 124 and the second installation region 125 are in a CRPS specification, and the CRPS specification is commonly used by redundant power modules nowadays and the associated details thereof are omitted for brevity. Further, the length of the separation member 12 in the installation space 112 is not limited to be equal to the overall length of the casing 11, and the length of the separation member 12 may be shorter than the overall length of the casing 11. Accordingly, the lengths of the two first baffles 121 and the two second baffles 122 are not limited to be equal to the overall length of the casing 11, and can be adjusted with the length of the separation member 12. In addition, the heights of the two first baffles 121 and the two second baffles 122 can also be adjusted according to requirements, and are not limited to be the height that the two first baffles 121 or the two second baffles 122 reach one of the side plates 111. Moreover, the first baffle 121 can consist of a plurality of components located on the same extension line rather than being limited to be formed by one single component. Similarly, the second baffle 122 can also consist of a plurality of components located on the same extension line rather than being limited to be formed by one single component.

Figure 6:
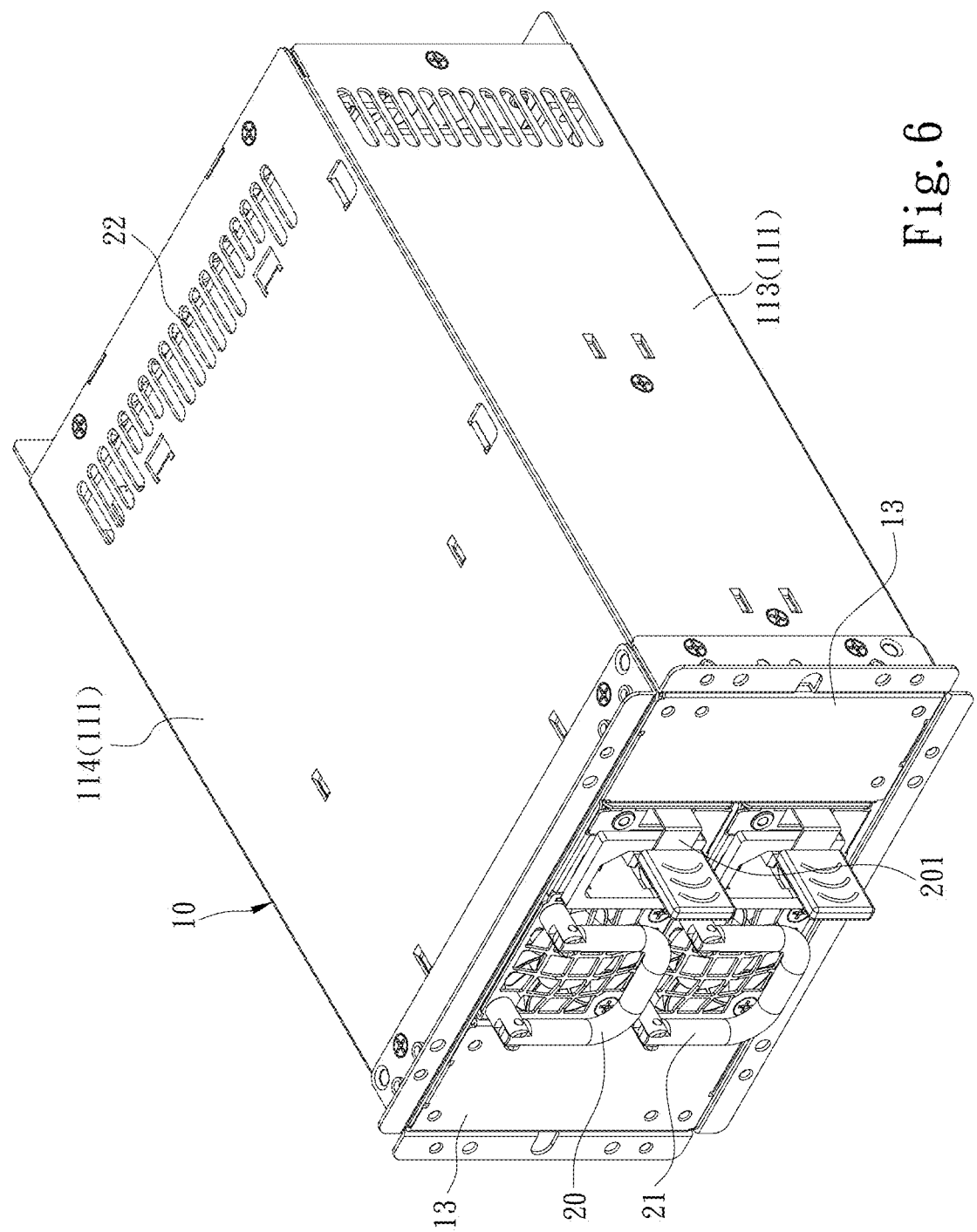
FIG. 6 is a first implementation schematic diagram of the power supply housing according to an embodiment of the present invention.
Figure 7:
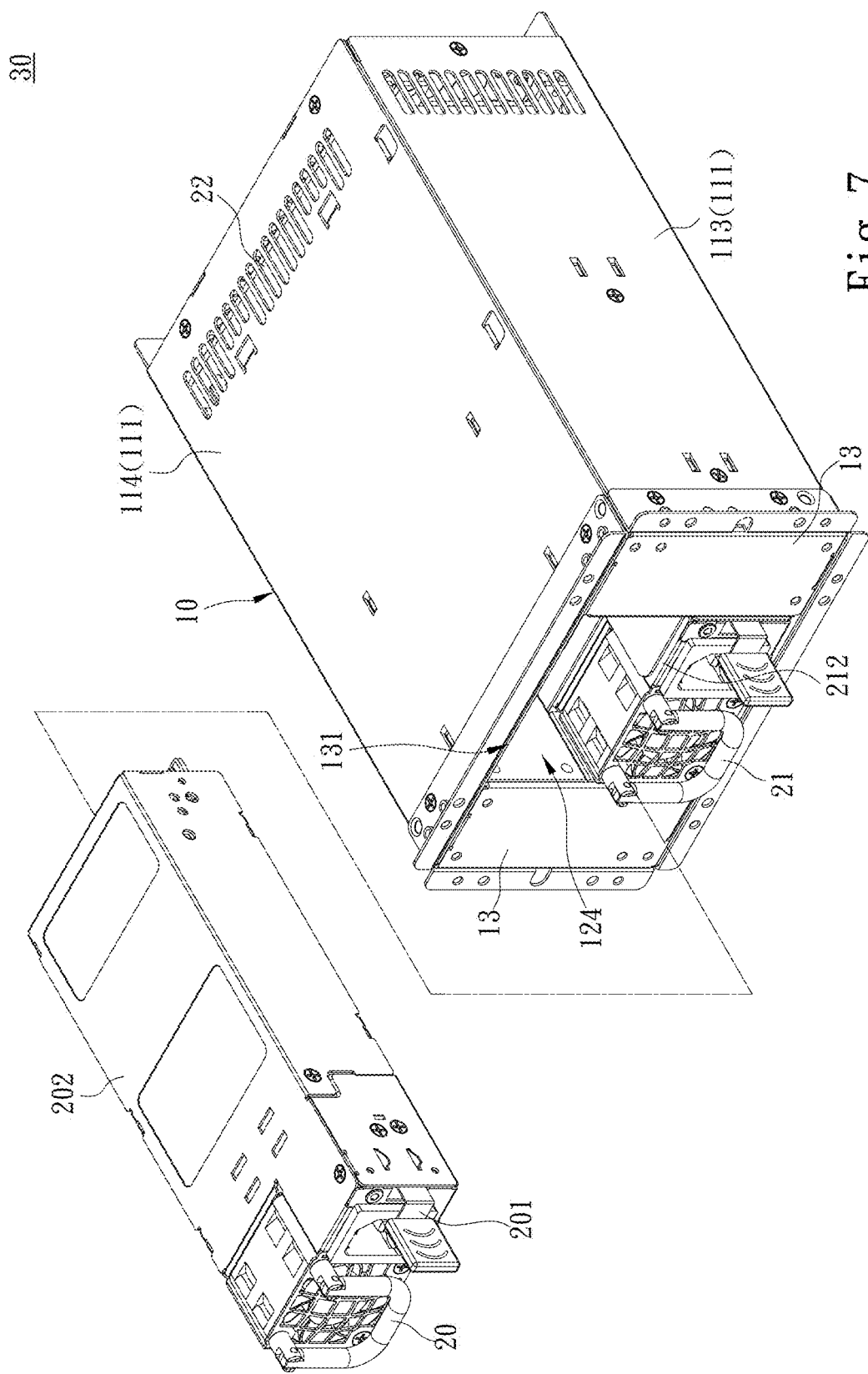
FIG. 7 is a second implementation schematic diagram of the power supply housing according to an embodiment of the present invention.

Besides, the two first baffles 121 are formed by two first plate members 14 assembled on the separation member 12, or are integrally formed by the separation member 12. Similarly, the two second baffles 122 are formed by two second plate members (not shown in the figures) assembled on the separation member 12, or are integrally formed by the separation member 12. As shown in FIG. 2 and FIG. 3, in this embodiment, the two first baffles 121 are formed by two first plate members 14 assembled on the separation member 12, and one of the two first plate members 14 includes a first positioning hole 141. The first positioning hole 141 is provided for fitting a positioning elastic piece 201 (as shown in FIG. 6 and FIG. 7) of a redundant power module 20 (or 21), wherein the positioning elastic piece 201 is an inherent structure on the redundant power module 20 (or 21) and associated details thereof are to be omitted for brevity. In the embodiment, the two second baffles 122 are integrally formed by the separation member 12. Further, in this embodiment, the separation member 12 includes a connecting plate 128 located in the second sub-space 116, and the connecting plate 128 is located on the extension line of the one of the two second baffles 122; that is to say, the connecting plate 128 is aligned with the one of the two second baffles 122. Further, the connecting plate 128 includes a second positioning hole 129 for disposing the positioning elastic piece 201.

Refer to FIG. 2, FIG. 3, FIG. 4 and FIG. 5. In one embodiment, as shown in the FIG. 4, the two first baffles 121 and the two second baffles 122 are respectively integrally formed by the separation member 12. Further, in this embodiment, the separation member 12 is not only formed with the connecting plate 128, but also assembled to a connecting piece 15. The connecting piece 15 is located in the first sub-space 115, and is aligned with one of the two first baffles 121. The connecting piece 15 is further located on the same axial line as the connecting plate 128, and includes a first through hole 151 having a same function as the first positioning hole 141. That is, the first through hole 151 allows the positioning elastic piece 201 to be fitted therein. Further, the connecting piece 15 is an independent component but not an integral component of the separation member 12.

Figure 4:
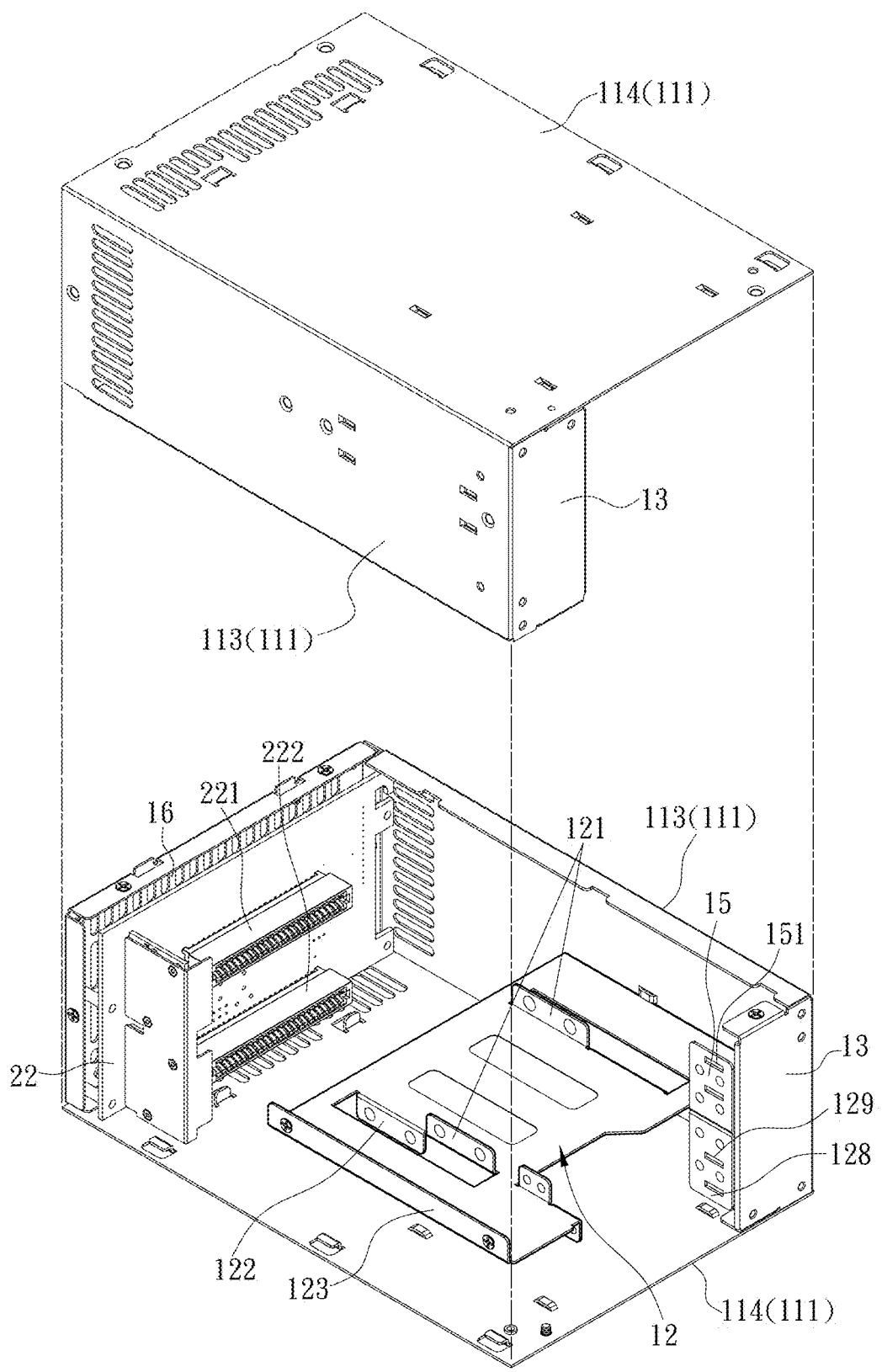
FIG. 4 is a structural exploded schematic diagram of the power supply housing according to another embodiment of the present invention.
Figure 5:
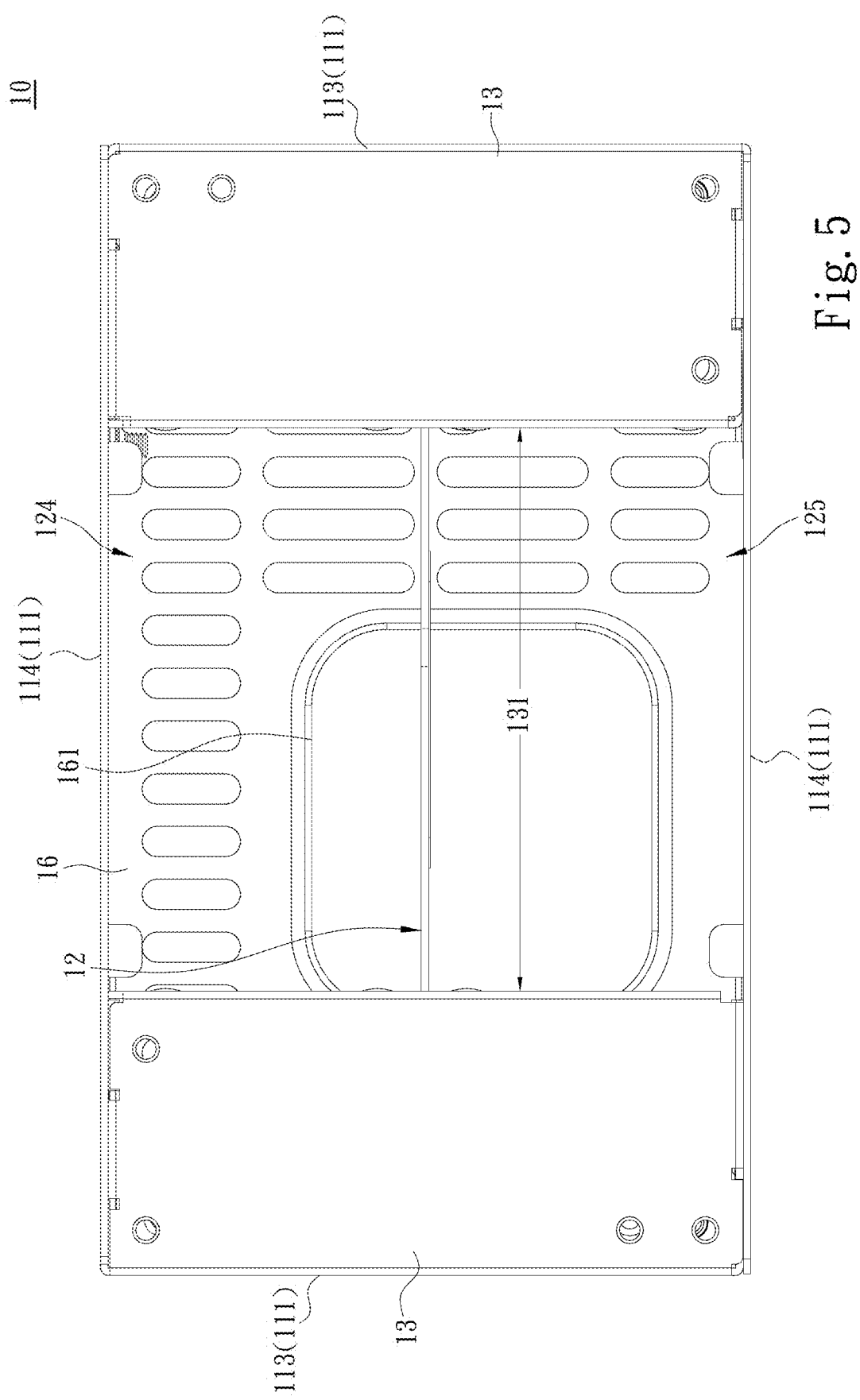
FIG. 5 is a structural schematic diagram of one side of the power supply housing according to an embodiment of the present invention.

Furthermore, the two front plates 13 are arranged at an opening on one end of the installation space 112, and are arranged at an interval so as to define a placement opening 131, wherein the size of the placement opening 131 is equal to a total cross sectional area of the first installation region 124 and the second installation region 125. That is to say, the two front plates 13 do not cover the first installation region 124 or the second installation region 125, and the placement opening 131 is respectively in communication with the first installation region 124 and the second installation region 125. In one embodiment, each of the two front plates 13 is integrally formed with one adjacent plate of the side plates 111. Namely, each of the two front plates 13 is integrally formed with one of the two vertical side plates 113 or one of the two horizontal side plates 114. As shown in FIG. 2, the two front plates 13 are integrally formed with one of the two vertical side plates 113 and one of the two horizontal side plates 114 adjacent to the vertical side plate 113. Referring to FIG. 2, FIG. 3, and FIG. 4, the back plate 16 is disposed on one end of the installation space 112 that is not provided with the two front plates 13; that is to say, the back plate 16 and the two front plates 13 are respectively located on two opposite ends of the casing 11. The back plate 16 includes at least one second through hole 161, and the through hole 161 allows a wiring harness or a connector to be inserted in the through hole 161 according to implementation needs.

Moreover, the components of the power supply housing 10 are mostly implemented by metal plates, and a person skilled in the art could understand how to process the metal plates based on existing general knowledge so as to form the foregoing integral forming structures of the present invention, and associated details are omitted herein for brevity.

In the present invention, the separation member 12, the two first baffles 121 and the two second baffles 122 define the first installation region 124 and the second installation region 125 for accommodating the redundant power module 20 (or 21). Compared to the prior art, in addition to no needs to arrange additional guide members installed on an inner edge of the casing 11, the present invention does not need a sub-casing additionally provided at the casing 11, thereby simplifying the structure of the power supply housing 10.

Referring to FIG. 1, FIG. 2, FIG. 3, FIG. 4, FIG. 5, FIG. 6, and FIG. 7, the power supply housing 10 can be implemented in conjunction with two redundant power modules 20, 21, so as to form a power supply 30. Further, the two redundant power modules 20, 21 respectively include outer housings 202, 212. During installation, a power integration back panel 22 matching the two redundant power modules 20 and 21 is disposed in the casing 11, and two electrical connection ports 221 and 222 on the power integration back panel 22 are respectively located in the first installation region 124 and the second installation region 125. Further, the first installation region 124 and the second installation region 125 respectively allow one of two redundant power modules 20 (or 21) to be accommodated therein, and the two redundant power modules 20, 21 are electrically connected to the power integration back panel 22 through the two electrical connection ports 221 and 222 to complete the power supply 30. In addition, the power integration back panel 22 does not refer to the back plate 16, and the power integration back panel 22 is mentioned in the U.S. Pat. No. 9,448,605 or the U.S. Pat. No. 9,401,627, which is provided by the Applicant. However, these disclosures are not to be construed as limitations to the implementation of the power integration back panel 22 of the present invention. The power supply housing 10 of the present invention suitable for a common desktop computer is built with a redundant power system by using the redundant power modules 20, 21 and the power integration back panel 22, thereby significantly improving the power density of the power supply 30. Additionally, the power supply stability of the power supply 30 is also enhanced in contribution to the redundant power system.

What is claimed is:

1. A power supply housing adapted to a redundant power module, comprising:

a casing, the casing comprising four side plates and an installation space defined by the four side plates, the four side plates opposite to each other in pairs;

a separation member, connected to two of the four side plates opposite to each other, the separation member dividing the installation space into a first sub-space and a second sub-space, the separation member comprising two first baffles located in the first sub-space and two second baffles located in the second sub-space, the two first baffles arranged at an interval and defining a first installation region for accommodating the redundant power module, the two second baffles arranged at an interval and defining a second installation region for accommodating the redundant power module, and the two first baffles are formed by two first plate members assembled on the separation member;

two front plates, disposed at an opening on one end of the installation space and respectively covering parts of the opening, a part of the opening not covered by the two front plates forming a placement opening, the placement opening serving as an entrance of the first installation region and the second installation region; and a back plate, disposed on one end of the installation space that is not provided with the two front plates, wherein one of the two first plate members comprises at least one first positioning hole to dispose a positioning elastic piece of the redundant power module.

2. The power supply housing adapted to the redundant power module of claim 1, wherein each of the two front plates integrally formed with one adjacent plate of the four side plates.

3. The power supply housing adapted to the redundant power module of claim 2, wherein the four side plates are divided into two vertical side plates and two horizontal side plates, and each of the two vertical side plates are integrally formed with one adjacent plate of the two horizontal side plates.

4. The power supply housing adapted to the redundant power module of claim 1, wherein a width and a height of the casing are in a PS2 specification, and widths of the first installation region and the second installation region are in a CRPS specification.

5. The power supply housing adapted to the redundant power module of claim 1, wherein the two first baffles are integrally formed by the separation member.

6. The power supply housing adapted to the redundant power module of claim 5, wherein the separation member comprises a connecting plate located in the second sub-space, and the connecting plate is aligned with one of the two second baffles and comprises a second positioning hole for disposing the positioning elastic piece.

7. The power supply housing adapted to the redundant power module of claim 1, wherein the two first baffles and the two second baffles are respectively integrally formed by the separation member.

8. The power supply housing adapted to the redundant power module of claim 7, further comprising:

a connecting piece, assembled on the separation member and aligned with one of the two first baffles, the connecting piece comprising at least one first through hole for disposing a positioning elastic piece of the redundant power module;

wherein, the separation member comprises a connecting plate located in the second sub-space, is aligned with one of the two second baffles and comprises a second positioning hole for disposing the positioning elastic piece.

9. The power supply housing adapted to the redundant power module of claim 8, wherein a width and a height of the casing are in a PS2 specification, and widths of the first installation region and the second installation region are in a CRPS specification.

10. The power supply housing adapted to the redundant power module of claim 1, wherein the two second baffles are integrally formed by the separation member.

11. The power supply housing adapted to the redundant power module of claim 1, wherein the two second baffles are formed by two second plate members assembled on the separation member.

* * * * *